(12) United States Patent
Sathish et al.

(10) Patent No.: US 9,218,605 B2
(45) Date of Patent: Dec. 22, 2015

(54) METHOD AND APPARATUS FOR MANAGING RECOMMENDATION MODELS

(75) Inventors: Sailesh Kumar Sathish, Tampere (FI); Jari P. Hamalainen, Kangasala (FI)

(73) Assignee: Nokia Technologies Oy, Espoo (FI)

(*) Notice: Subject to any disclaimer, the term of this patent is extended or adjusted under 35 U.S.C. 154(b) by 183 days.

(21) Appl. No.: 13/238,334

(22) Filed: Sep. 21, 2011

(65) Prior Publication Data

US 2013/0073485 A1    Mar. 21, 2013

(51) Int. Cl.
*G06F 15/18* (2006.01)
*G06Q 30/02* (2012.01)
*G06N 99/00* (2010.01)

(52) U.S. Cl.
CPC .............. *G06Q 30/02* (2013.01); *G06N 99/005* (2013.01)

(58) Field of Classification Search
CPC ..... G06N 99/005; G06N 5/025; G06N 7/005; G06K 9/6256; G06K 9/6269
See application file for complete search history.

(56) References Cited

U.S. PATENT DOCUMENTS

| | | | |
|---|---|---|---|
| 4,993,068 A * | 2/1991 | Piosenka et al. | 713/186 |
| 6,377,937 B1 * | 4/2002 | Paskowitz | 705/26.82 |
| 6,961,448 B2 * | 11/2005 | Nichols et al. | 382/115 |
| 7,031,961 B2 * | 4/2006 | Pitkow et al. | |
| 7,082,426 B2 * | 7/2006 | Musgrove et al. | |
| 7,567,946 B2 * | 7/2009 | Andreoli et al. | 706/46 |
| 7,668,821 B1 | 2/2010 | Donsbach et al. | |
| 7,774,279 B2 * | 8/2010 | Wang et al. | 705/51 |
| 7,774,472 B2 * | 8/2010 | Tanner et al. | 709/226 |
| 7,949,574 B2 * | 5/2011 | Patel et al. | 705/26.7 |
| 8,065,520 B2 * | 11/2011 | Hsu et al. | 713/162 |
| 8,286,227 B1 * | 10/2012 | Zheng | 726/6 |
| 8,484,132 B1 * | 7/2013 | Christiansen et al. | 705/44 |
| 8,527,584 B2 * | 9/2013 | Sathish | 709/203 |
| 2001/0031071 A1 * | 10/2001 | Nichols et al. | 382/115 |
| 2001/0046862 A1 * | 11/2001 | Coppinger et al. | 455/435 |
| 2004/0043758 A1 * | 3/2004 | Sorvari et al. | 455/414.1 |
| 2004/0103092 A1 * | 5/2004 | Tuzhilin et al. | 707/3 |
| 2005/0189415 A1 * | 9/2005 | Fano et al. | 235/383 |
| 2006/0039389 A1 * | 2/2006 | Burger et al. | 370/401 |

(Continued)

FOREIGN PATENT DOCUMENTS

| | | |
|---|---|---|
| WO | 2006/004800 A2 | 1/2006 |
| WO | 2012/142748 A1 | 10/2012 |
| WO | 2012/142751 A1 | 10/2012 |

OTHER PUBLICATIONS

Victoria Bellotti, et al., "Activity-Based Serendipitous Recommendations with the Magitti Mobile Leisure Guide," Proceedings, CHI 2008, pp. 1157-1161, Apr. 5-10, 2008, Florence, Italy.*

(Continued)

*Primary Examiner* — Kakali Chaki
*Assistant Examiner* — Fuming Wu
(74) *Attorney, Agent, or Firm* — Ditthavong & Steiner, P.C.

(57) ABSTRACT

A platform for managing recommendation models is described. The platform processes and/or facilitates a processing of at least one user identification characteristic associated with at least one device to determine a user identity. The platform further determines at least one communication account active at the at least one device. The platform also causes, at least in part, an association of one or more recommendations models with the user identity, the at least one communication account, the at least one device, or a combination thereof.

18 Claims, 12 Drawing Sheets

(56) References Cited

U.S. PATENT DOCUMENTS

| | | | |
|---|---|---|---|
| 2006/0061451 A1* | 3/2006 | Chen | 340/5.53 |
| 2006/0206445 A1* | 9/2006 | Andreoli et al. | 706/52 |
| 2006/0265089 A1* | 11/2006 | Conway et al. | 700/94 |
| 2006/0272028 A1* | 11/2006 | Maes | 726/27 |
| 2006/0282303 A1* | 12/2006 | Hale et al. | 705/10 |
| 2007/0005419 A1* | 1/2007 | Horvitz et al. | 705/14 |
| 2008/0060662 A1* | 3/2008 | Oh et al. | 128/897 |
| 2008/0086402 A1* | 4/2008 | Patel et al. | 705/35 |
| 2008/0172293 A1* | 7/2008 | Raskin et al. | 705/14 |
| 2009/0102679 A1* | 4/2009 | Schoettle | 340/815.4 |
| 2009/0234760 A1* | 9/2009 | Walter | 705/30 |
| 2009/0327762 A1* | 12/2009 | Boudreaux | 713/194 |
| 2010/0030578 A1* | 2/2010 | Siddique et al. | 705/3 |
| 2010/0042669 A1* | 2/2010 | Cohen et al. | 709/201 |
| 2010/0174813 A1* | 7/2010 | Hildreth et al. | 709/224 |
| 2011/0004612 A1* | 1/2011 | Boyersmith et al. | 707/769 |
| 2011/0072370 A1* | 3/2011 | Mitchell et al. | 715/762 |
| 2012/0022945 A1* | 1/2012 | Falkenborg et al. | 705/14.53 |
| 2012/0079400 A1 | 3/2012 | Nauerz et al. | |
| 2012/0158622 A1* | 6/2012 | Mital et al. | 706/12 |
| 2012/0166377 A1 | 6/2012 | Sathish et al. | |
| 2012/0204257 A1* | 8/2012 | O'Connell et al. | 726/19 |
| 2012/0209839 A1* | 8/2012 | Andrews et al. | 707/728 |
| 2013/0073485 A1* | 3/2013 | Sathish et al. | 706/12 |

OTHER PUBLICATIONS

Notification of Transmittal of the International Search Report and the Written Opinion of the International Searching Authority, or the Declaration for International Application No. PCT/FI2012/050829, dated Feb. 11, 2013, pp. 1-18.

Doulkeridis et al., "A System Architecture for Context-Aware Service Discover," Journal, Jan. 2006, vol. 146, Issue 1, pp. 101-116 101-116.

Google—Inside Search, "Sign in to save search settings," Retrieved from the Internet Archive, Archived Jul. 6, 2012, http://web.archive.org/web/20120706172948/http://support.google.com/websearch/bin/answer.py?hl=en&answer=2539428>.

* cited by examiner

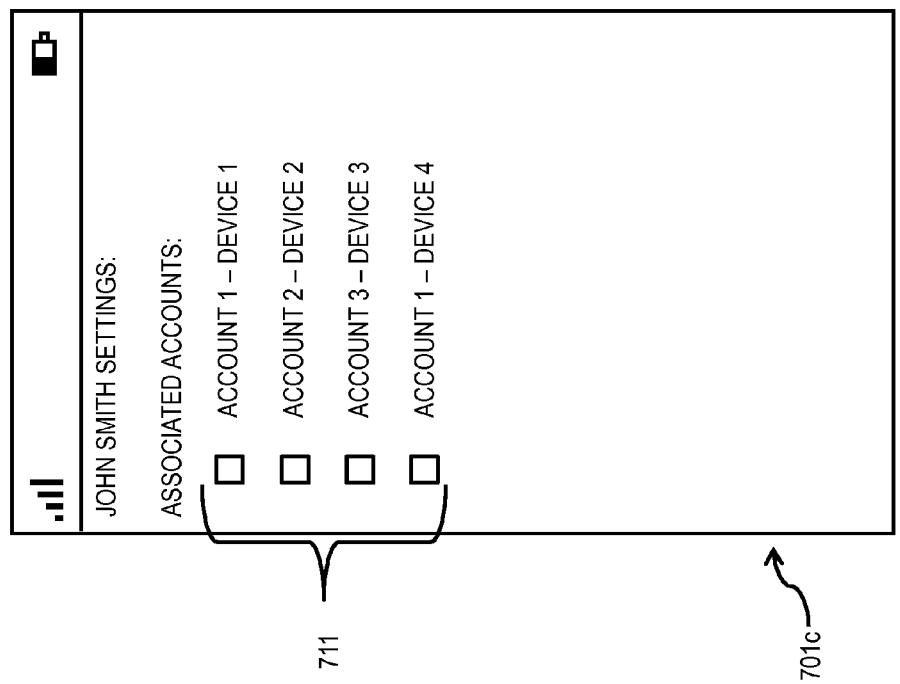

METHOD AND APPARATUS FOR MANAGING RECOMMENDATION MODELS

BACKGROUND

Service providers and device manufacturers (e.g., wireless, cellular, etc.) are continually challenged to deliver value and convenience to consumers by, for example, providing compelling network services. Such compelling network services include generating recommendation models to provide consumers with personalized user experiences. Additionally, modern devices now accept multiple accounts (e.g., two or more subscriber identity modules (SIMs)) that allow one device to identify with multiple accounts on cellular networks. For example, a dual SIM device allows a consumer to use the same device for both work and leisure by using the device through different SIMs. As a result of the different usage of the device through different accounts, the requirements for interaction, behavior and general purpose are different when using the different accounts. However, the difference in use of the device according to the different accounts (e.g., work and leisure) may not be reflected in recommendations provided based on service providers' recommendation models because current recommendation frameworks associate a single user behavior for a single device. The duality or multiplicity of user behavior is not taken into account when associated with a multi-account compatible device. Such is also the case when considering multiple users using the same account and/or device, or a single user using different accounts on different devices. Thus, service providers and device manufacturers face significant technical challenges for managing recommendation models that consider multi-user, multi-account, and/or multi-device usage by consumers.

SOME EXAMPLE EMBODIMENTS

Therefore, there is a need for an approach for managing recommendation models across one or more user identities, one or more communication accounts, and one or more devices.

According to one embodiment, a method comprises processing and/or facilitating a processing of at least one user identification characteristic associated with at least one device to determine a user identity. The method also comprises determining at least one communication account active at the at least one device. The method further comprises causing, at least in part, an association of one or more recommendations models with the user identity, the at least one communication account, the at least one device, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of at least one user identification characteristic associated with at least one device to determine a user identity. The apparatus is also caused to determine at least one communication account active at the at least one device. The apparatus is further caused to cause, at least in part, an association of one or more recommendations models with the user identity, the at least one communication account, the at least one device, or a combination thereof.

According to another embodiment, a computer-readable storage medium carries one or more sequences of one or more instructions which, when executed by one or more processors, cause, at least in part, an apparatus to process and/or facilitate a processing of at least one user identification characteristic associated with at least one device to determine a user identity. The apparatus is also caused to determine at least one communication account active at the at least one device. The apparatus is further caused to cause, at least in part, an association of one or more recommendations models with the user identity, the at least one communication account, the at least one device, or a combination thereof.

According to another embodiment, an apparatus comprises means for processing and/or facilitating a processing of at least one user identification characteristic associated with at least one device to determine a user identity. The apparatus also comprises means for determining at least one communication account active at the at least one device. The apparatus further comprises means for causing, at least in part, an association of one or more recommendations models with the user identity, the at least one communication account, the at least one device, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 7A-7C are diagrams of user interfaces utilized in the processes of FIGS. 3-6, according to various embodiments;

DESCRIPTION OF SOME EMBODIMENTS

Examples of a method, apparatus, and computer program for managing recommendation models are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
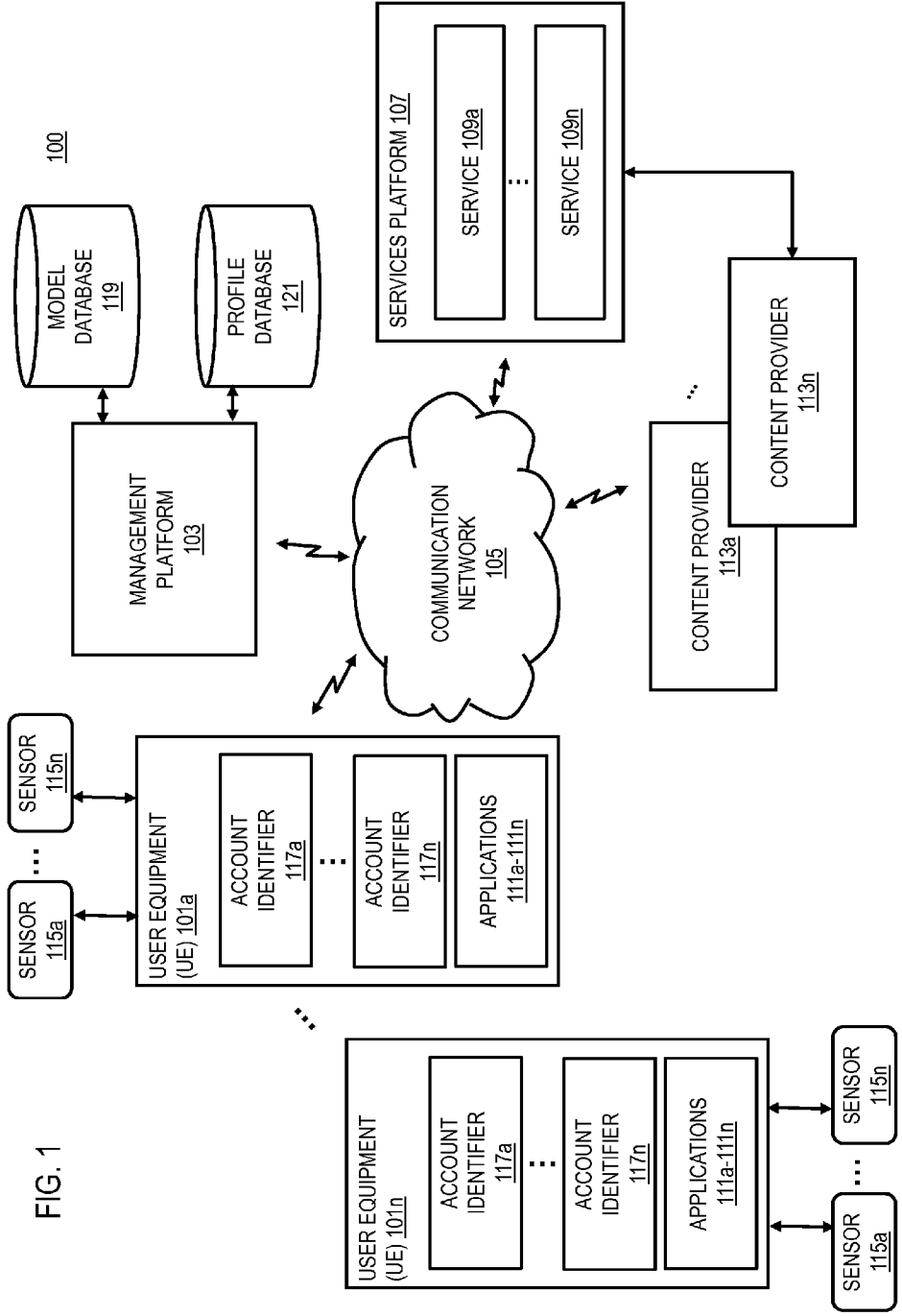
FIG. 1 is a diagram of a system capable of managing recommendation models, according to one embodiment.

FIG. 1 is a diagram of a system 100 capable of managing recommendation models, according to one embodiment. Recommendation models provide users with more personalized user experiences based on, for example, personalized recommendations and/or personalized adaptations. However, current recommendation frameworks are based on single user behavior for generating recommendation models. Often, recommendation models are associated with the device and are based on how users interact with applications installed on the device etc., Recommendation models are not associated with a specific user and/or account associated with the device. Thus, the duality or multiplicity of user behavior associated with a device is not directly accounted for, especially in the context of devices that have multi-account frameworks (e.g., a device that accepts more than one account). Rather, any duality or multiplicity of user behavior associated with a device is at best indirectly accounted for through changes in the context information and/or application usage data associated with the device as a result of the changes in the behavior and/or behaviors of the user and/or users associated with the device. Such a framework, however, fails to provide true personalized user experiences. Rather, the experiences are at best a blending of experiences across a multiplicity of users and/or behaviors associated with users.

To address this problem, a system 100 of FIG. 1 introduces the framework to provide the capability to manage recommendation models taking into account various permutations of multi-user, multi-account, and/or multi-device usage to provide personalized user experiences. The system 100 may distinguish between multiple users, multiple accounts and/or multiple devices to provide recommendation models for generating recommendations for more personalized user experiences.

By way of example, the system 100 may determine a user's identity associated with a device among several user identities. By determining the user's identity associated with the device, the system 100 is able to provide the user with a more personalized user experience rather than a user experience that is at best an average of the multi-users that may use the device.

The system 100 may determine the user's identity by processing user identification characteristics that are associated with and identity the user. The system 100 uses one or more recognition engines to determine the user identification characteristics. Such engines may include voice analytic engines that analyze, for example, voice patterns of the user, voice identification, interaction pattern analytic engines that analyze, for example, interaction patterns of the user, fingerprint identification etc. or even a user code identification that do not use any analytics.

The system 100 may also determine a communication account active at the device. The communication account may be determined, for example, based on the active SIM card in the device among two or more SIM cards. Thus, the system 100 accounts for dual or multi-account devices such that a single user and/or multiple users can use multiple accounts with the device.

By way of example, a single user may have a business account and a personal account associated with a single device. The system 100 may determine whether the business account (e.g., SIM card for business use) or the personal account (e.g., SIM card for personal use) is active and distinguish between the user using the device for business use and the user using the device for personal use, at least based on which account is active.

Further, the system 100 may determine whether a first user account associated with a first user is active, or a second user account associated with a second user is active. Thus, for example, two users and/or groups of users may use a single device associated with two accounts. Such a situation may occur where, for example, a family uses a single device but pays separate bills between the parents and the children, or two families use a single device and pay separate bills between the two families. Thus, the system 100 may distinguish between the first user and the second user, and the system 100 also may distinguish between the first user account and the second user account. Accordingly, the combination of user identity, user account (communication account), and device creates unique model identities that can distinguish between multiple users, multiple account, and multiple devices.

The system 100 may also determine that a single user is associated with multiple devices. The system 100 is able to accommodate such situations to provide recommendation models across the multiple devices to provide a consistent personalized user experience despite the user being associated with multiple devices. By way of example, a user may have a device for personal use and a device for business use. Despite the different uses of the devices, the user may wish to share application data associated with the two devices (e.g., email accounts, contacts) to provide consistent personalized user experiences across the two devices related to the shared application data. By determining that a single user is associated with multiple devices, the system 100 is able to accommodate such sharing.

According to the foregoing, the system 100 may associate one or more recommendation models with one or more user identities, one or more communication accounts, one or more devices, or a combination thereof to provide personalized user experiences taking into consideration of the multi-user, multi-account and/or multi-device combinations that are possible considering the multi-user and multi-account combinations possible with modern devices.

As shown in FIG. 1, the system 100 comprises user equipment (UE) 101 (collectively referred to as UE 101) having connectivity to the management platform 103 via a communication network 105. The UE 101 may include one or more applications 111a-111n (collectively referred to as applications 111). One of the applications 111 may enable the UE 101 to interact with, for example, the management platform 103 to provide account analytics information to the management platform 103 for determining a user associated with a UE 101. One of the applications 11 may enable the UE 101 to interact with the management platform 103 to provide one or more recommendations to the user of the UE 101 based on one or more recommendation models. The applications 111 may also include additional applications, such as a navigation application, a calendar application, a web browser application, a contacts list application, a settings application, etc. that may provide context information and/or application usage data associated with the UE 101 and/or the user of the UE 101. For example, the navigation application may provide a location of the UE 101, the calendar application may provide an appointment associated with the user of the UE 101, a contacts list application may provide one or more contacts (e.g., family members, friends, co-workers) associated with the user of the UE 101, etc.

Connected to, or part of, the UE 101 may be one or more sensors 115a-115n (collectively referred to as sensors 115) to collect data, for instance, relating to the UE 101 and/or the user of the UE 101. The sensors 115 may be used to provide additional context information and/or application usage data associated with the UE 101 and/or the user of the UE 101. For example, the sensors 115 may include a GPS sensor for providing location information associated with the UE 101, a light sensor for providing information regarding the lighting surrounding the UE 101, and the like. Also connected to, or part of, the UE 101 are one or more account identifiers 117a-117n (collectively referred to as account identifiers). The account identifiers may be associated with accounts that allow the UE 101 on cellular networks. An exemplary embodiment of an account identifier is a subscriber identity module (e.g., SIM-card) that is associated with a phone number associated with the UE 101 on the cellular networks (e.g., discussed in detail with respect to FIG. 10 below).

The management platform 103 may include or have access to a model database 119 to obtain and store recommendation models associated with the various users, communication accounts, and devices associated with the management platform 103. The management platform 103 also may include or have access to a profile database 121 to obtain and store profiles associated with the various users, communication accounts, and devices associated with the management platform 103, and the recommendation models associated with the management platform 103.

The system 100 also may include a services platform 107 that includes one or more services 109a-109n (collectively referred to as services 109) and one or more content providers 113a-113n (collectively referred to as content providers 113). The services platform 107 may provide one or more of the services 109 to the UE 101 and/or the management platform 103. The content providers 113 may provide content to the UE 101, the management platform 103, and/or the services platform 107. For example, a particular service 109a (e.g., a music or video service) may obtain content (e.g., media content) from a particular content provider 113a to offer to the UE 101 based on one or more recommendations generated by one or more recommendation models obtained by the management platform 103 from the model database 119 according to the active user of the UE 101, the active communication account associated with the UE 101, and/or the specific UE 101.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the management platform 103 associates one or more recommendation models based on one or more model identifiers. The model identifiers are generated based on a concatenation of one or more identifiers of the user identity, one or more identifiers of at least one communication account, one or more identifiers of at least one device, or a combination thereof. The one or more identifiers of the user identity identify all of the users that are associated with the management platform 103 with respective unique identities. The one or more identifiers of the at least one communication account identify all of the communication accounts that are associated with the management platform 103 with respective unique identities. The one or more identifiers of the device identify all of the devices that are associated with the management platform 103 with respective unique identities.

By way of example, a model identifier may be formatted according to [USER IDENTIFIER].[ACCOUNT IDENTIFIER].[DEVICE IDENTIFIER] (e.g. [USER]. [ACCOUNT] .[DEVICE], such that exemplary model identifiers include:

1) USER1.ACCOUNT1.DEVICE1
2) USER1.ACCOUNT2.DEVICE1
3) USER1.ACCOUNT3.DEVICE2
4) USER2.ACCOUNT4.DEVICE1

Here, model identifiers 1 and 2 are associated with the same user and device, but with different communication accounts. For example, a single user has a single multi-SIM device for use with both a business account and a personal account. Model identifiers 1 and 3 are associated with the same user, but with different communication accounts and devices. For example, a single user is provided with an account and a device by the user's employer, and the user bought a different device associated with a different account for personal use. Model identifiers 1 and 4 are associated with different users and communication accounts, but with the same device. For example, two friends use the same device, but pay for usage of the device through two separate accounts.

In one embodiment, one or more respective profiles can be designated for the one or more model identifiers. For example, model identifier 1 above may be associated with the profile BUSINESS for USER1 and model identifier 2 may be associated with the profile personal for USER1. Thus, for example, ACCOUNT1 may be an account setup by USER1's employer, and ACCOUNT2 may be an account setup by USER1 personally.

By way of the model identifiers, a selection of one or more of the identifiers of a user identity, one or more of the identifiers of a communication account, one or more identifiers of the device, or a combination thereof may be selected as a key identifier. Then, one or more model identifiers that share the key identifier in common may be grouped together, and one or more recommendation models associated with the model identifiers also may be grouped together. Thus, for example, a user that has two or more accounts associated with the same device, or two or more accounts associated with two or more devices may associate the recommendation models generated specifically based on the application data associated with the two or more accounts, and/or two or more devices, based on the identifier of the user's identity (e.g., key identifier), which is shared between the model identifiers.

In one embodiment, one or more recommendation models associated with model identifiers may be shared among the model identifiers. The sharing of the one or more recommendation models may be based on one or more commonalities of among the user identity, the at least one communication account, the at least one device, or a combination thereof. By way of example, multiple users that use the same device may have one or more recommendation models associated with their respective communication accounts. However, the users may share one or more of their recommendation models between each other based on, for example, the common device that both of the user use. Further, if multiple users share the same communication account and the same device, but have respective one or more recommendation models based on the difference in the user identities (e.g., based on different user indication characteristics), the user may still share the one or more recommendation models on the same account and the same device.

In one embodiment, the management platform 103 allows for the capturing of application usage data associated with a user identity, at least one communication account, at least one device, or a combination thereof. By way of example, upon the management platform 103 determining a specific user identify, a specific communication account, and a specific device that are currently active, such as for a specific model identifier, the management platform 103 determines application usage data associated with the specific model identifier and may store the application usage data associated with each of the specific user identity, the specific communication account, and the specific device. For users that have more than one communication account and/or more than one device, the application usage data associated with each one of the communication accounts and each one of the devices may be stored according to the same user identity, while differences between the application usage data associated with each one of the communication accounts and each one or the devices also may be stored according to the specific communication accounts and the specific devices.

Thus, the management platform 103 generates a hierarchical structure of application usage data based on, for example, the user identity, the communication account, and the device. Using this application usage data, latent factor models may be created with one vector for the latent model created for all common items between a user's accounts and/or devices are indexed to the same user. Multiple vectors may be created for each combination of user identity, communication account, and device where the application usage data is either not associated between the various user identities, communication accounts, and/or devices (e.g., model identifiers), or where the application usage data is different and the user associated with the specific user identity chooses to keep the multiple vectors.

Explicit models (e.g., rule-based) may also be created in a hierarchical structure, with a single model (or representation) created based on the application usage data but separate branches are maintained for each deviation in the application usage data. Thus, for example, all application usage data for a user is maintained in a single branch at the user identity level, while specific branches of the hierarchical structure are built for the same user with differences in the application usage data at the communication account level and/or at the device level. When using an explicit model for recommendation services (e.g., in response to applications/recommendation engines), the user identity level may be alone, may be narrowed down to a communication account level and/or a device level (e.g., branches off of the user identity level).

In one embodiment, the application usage data itself may be used to create other hierarchical levels for model generation. For example, the management platform may determine the identity of the user and also determine the context of the user, such as whether the user is using the same communication account and the same device for both business and pleasure. Thus, the management platform 103 may create hierarchical levels in the context of the user, where otherwise there is no distinction in the level (e.g., USER1.BUSINESS.ACCOUNT1. DEVICE1 vs. USER1.PERSONAL.ACCOUNT1.DEVICE1).

After capturing the application usage data, the management platform 103 processes the application usage data to cause a generation of the one or more recommendation models. Thus, one or more recommendation models are generated for a given combination of user identity, communication account, and/or device, and can be associated with each user identity, communication account, and/or device, respectively. Further, the recommendation models can be generated for given combinations of user identity, user context, communication account, and/or device where the application usage data collected by the management platform 103 is also used to distinguish the usage of the user.

In one embodiment, upon an application 111, a service 109*a* on the services platform 107, or a content provider 113 requesting one or more recommendation models and/or one or more recommendations from the management platform 103, the management platform 103 determines the active user identity, the active at least one communication account, the active at least one device, or a combination thereof, the management platform 103 processes the one or more recommendation models associated with the active user identity, communication account, device, or a combination thereof and generates one or more recommendations for presentation at the active device.

By way of example, the UE 101, the management platform 103, the services platform 107, and the content providers 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2A:
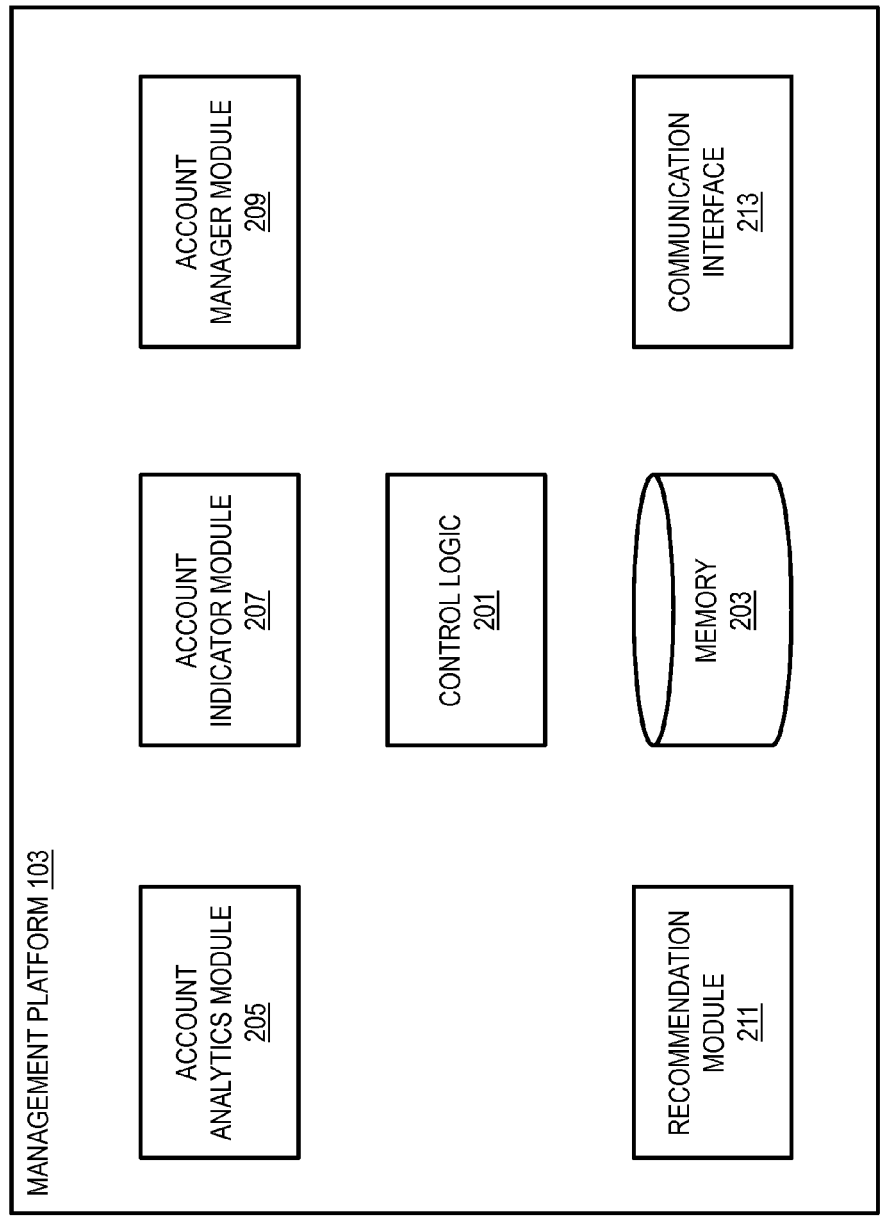
FIG. 2A is a diagram of the components of a management platform, according to one embodiment.

FIG. 2 is a diagram of the components of the management platform 103, according to one embodiment. By way of example, the management platform 103 includes one or more components for managing recommendation models. It is contemplated that the functions of these components may be combined in one or more components or performed by other components of equivalent functionality. For example, the management platform 103 may be embodied in the UE 101 as one or more applications 111 executed by the UE 101. In the illustrated embodiment, the management platform includes control logic 201, memory 203, an account analytics module 205, an account indicator module 207, an account manager module 209, a recommendation module 211, and a communication interface 213.

The control logic 201 executes one or more algorithms stored in the memory 203 for executing functions of the management platform 103. For example, the control logic 201 may interact with the data account analytics module 205 to cause collection of account analytics information for determining a user of a UE 101. The control logic 201 also may interact with the account indicator module 207 to cause an indication of the communication account active at a UE 101. The control logic 201 may also cause a generation of at least one recommendation from at least one recommendation model associated with, for example, an active communication account.

The account analytics module 205 determines the user identity of the user of the UE 101 by processing user identification characteristics that are associated with the identity of the user. The account analytics module 205 uses a suite of technologies to analyze the user identification characteristics and determine the user identity. Such technologies include, for example, voice analytic engines that analyze, for example, voice patterns of the user, interaction pattern analytic engines that analyze, for example, interaction patterns of the user, user probability analytic engines that analyze, for example, probabilities associated with a user interacting with a device, Bayesian analyzers, and the like.

Upon determining the user identification characteristics associated with a user identity, the account analytics module 205 stores the user identification characteristics in, for example, the profile database 121 associated with the specific use identity. Thus, upon receiving user identification characteristics from, for example, at UE 101, or one or more services 109 running on the services platform from the UE 101, the account analytics module 205 compares the received user identification characteristics with the user identification characteristics stores in the profile database 121 according to the user identities to determine the user identity associated with the received user characteristics.

In one embodiment, the account analytics module 205 also determines the application usage data and/or the context information associated with the UE 101 and the user of the UE 101. The account analytics module 205 may determine the application usage data and/or the context information associated with the UE 101 and the user of the UE 101, by interface with one or more applications 111 running on the UE 101, one or more sensors 115 associated with the UE 101, one or more services 109 on the services platform 107 that may be associated with the UE 101 and/or the user of the UE 101 (e.g., social networking services), and the like. Thus, the account analytics module 205 determines the application usage data and/or the that is used to generate the one or more recommendation models, and may be used to determine the context of the user identity to further define the generated one or more recommendation models.

The account indicator module 207 determines the one or more communication accounts that are associated with a UE 101, and the communication account that is active at a UE 101. The account indicator module 207 may determine the communication accounts that are associated with the UE 101, and which are active at the UE 101, by prompting the UE 101 for the account identifiers 117. By way of example, the UE 101 may determine which account identifiers 117 are currently associated with the UE 101, and which account identifiers are currently active at the UE 101, and forward the information to the account indicator module 207. In one embodiment, the information regarding the communication accounts active at the UE 101 includes identifiers of the specific UE 101. Thus, by way of example, the account indicator module 207 receives information formatted according to [ACCOUNT].[DEVICE], where [ACCOUNT] indicates the communication account and [DEVICE] indicates the device.

The account manager module 209 tracks the associations between the user identities, the communication accounts, and the devices. Each time the account analytics module 205 determines a user identity, the account analytics module 205 passes the user identity to the account manager module 209, and the account manager module 209 stores the information in the profile database 121. Further, each time the account indicator module 207 determines a communication account and/or a device, the account indicator module 207 passes the communication account and the device to the account manager module 209 and the account manager module 209 stores the information in the profile database 121. Thus, the account manager module 209 stores which user identities are associated with which communication accounts, and which communication accounts are associated with which devices, and which user identities are associated with which devices.

The account manager module 209 also accounts for one or more association policies used to associate one or more recommendation models based on a user identity, at least one communication account, at least one device, or a combination thereof. The one or more policies may be stored in the profile database 121. The account manager module 209 also accounts for one or more policies used to share one or more recommendation models based on a user identity, at least one communication account, at least one device, or a combination thereof. The one or more sharing policies may be stored in the profile database 121.

The recommendation module 211 generates the one or more recommendation models associated with the various user identities, communication accounts, and/or devices. The recommendation module 211 may generate the one or more recommendation models based on any type of recommendation framework. For example, the one or more recommendation models may be based on one or more latent factor models, one or more rule-based models, or a combination thereof. The framework for managing the recommendations models between user identities, communication accounts, and/or devices may be independent of the specific type of recommendation framework used to generate the recommendation models. The generated recommendation models may be stored in the model database 119.

The control logic 201 may also utilize the communication interface 213 to communicate with other components of the system 100, such as the UE 101, the services platform 107, and the content providers 113. By way of example, the communication interface 213 may assist in initiating the transfer of content from a content provider 113a in response to a the user selecting the content based on a recommendation from one or more recommendation models associated with an active communication account at the UE 101. The communication interface 213 may also assist in communicating with an application 111a at the UE 101 used in transferring information regarding the active user of the UE 101, the active communication account of the UE 101, and may also assist in rendering the user interfaces at the UE 101 for interacting with the management platform 103.

Although the management platform 103 is illustrated as including the control logic 201, the memory 203, and the communication interface 213, in one embodiment, where the management platform 103 is embodied as an application 111a running on the UE 101, the control logic 201 may be one or more algorithms running on the UE 101 and/or stored in the memory of the UE 101. Further, in such an embodiment, the communication interface 213 may not be required.

Figure 2B:
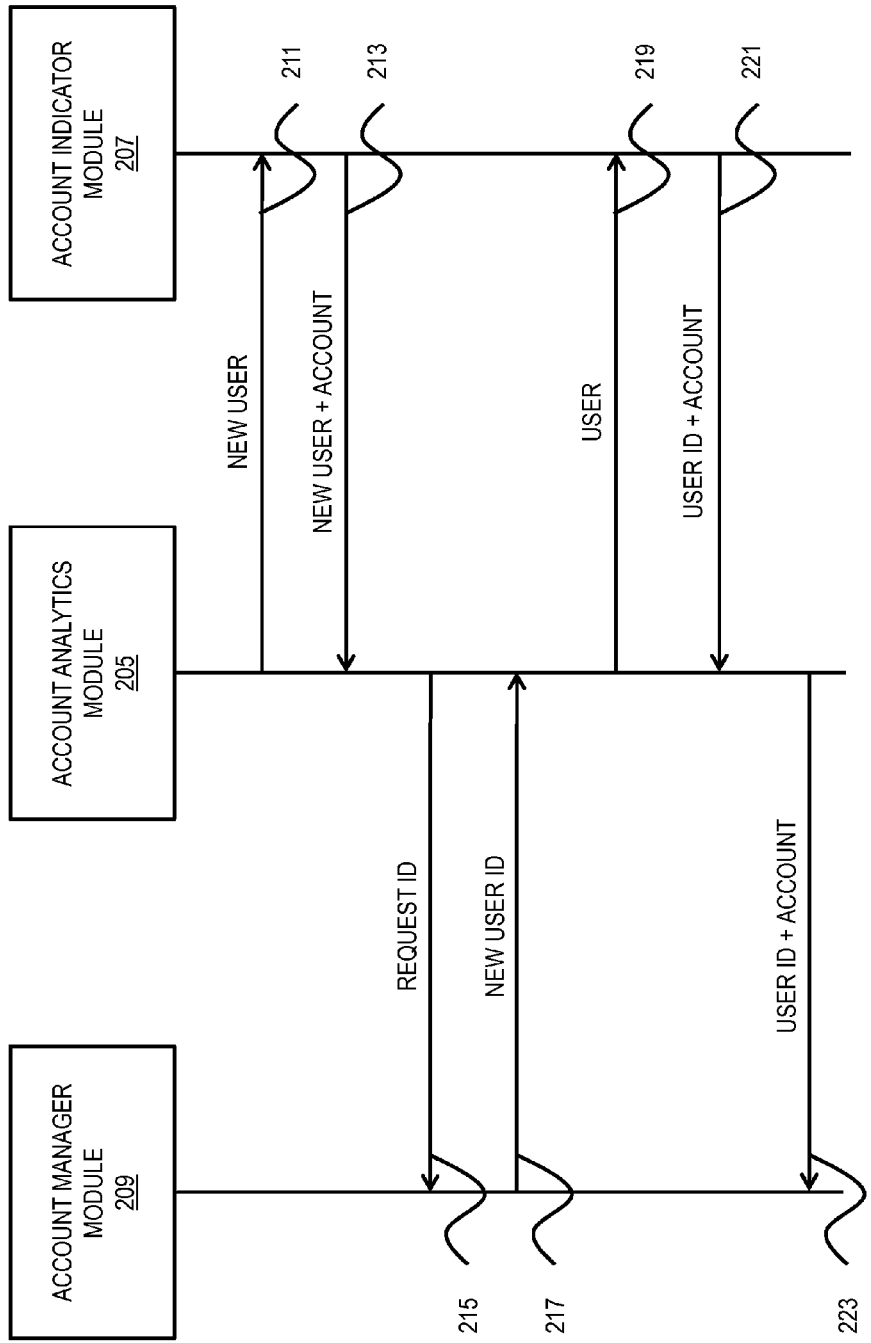
FIG. 2B is a timing diagram for registering a new user with the management platform, according to one embodiment.
Figure 9:
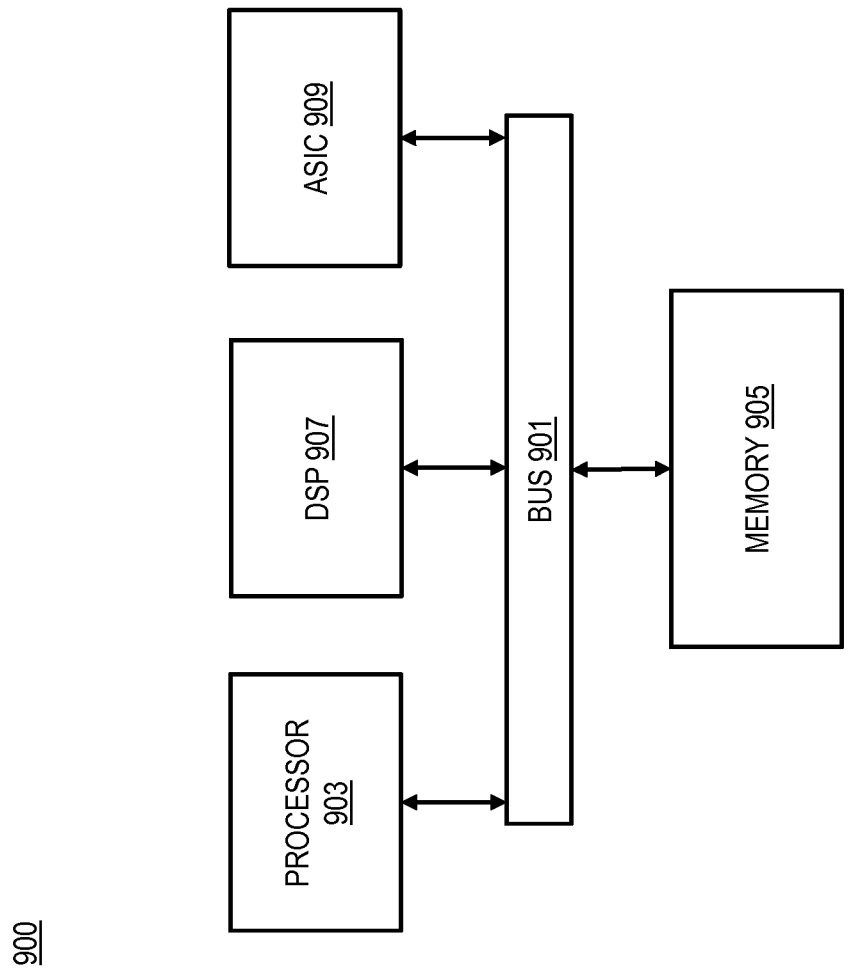
FIG. 9 is a diagram of a chip set that can be used to implement an embodiment of the invention.

FIG. 2B is a timing diagram for registering a new user with the management platform, according to one embodiment. In one embodiment, the management platform 103 performs the process 200 and is implemented in, for instance, a chip set including a processor and a memory as shown in FIG. 9. In step 211, the account analytics module 205 performs account analytics on one or more user identification characteristics received from a UE 101. The account analytics are processed by the account analytics module 205 to determine the user identity. If the user identification characteristics do not match any user identification characteristics already associated with a user identity, the account analytics module 205 requests the communication account identifier and the device identifier from the account indicator module 207. The account analytics module 205 also stores the new user identification characteristics for future comparison to determine the new user in the future.

In step 213, the account indicator module 207 retrieves the communication account identifier that is associated with the current user identification characteristics and passes the communication account identifier and the device identifier associated with the UE 101 that the new user is using to interact with the management platform 103 to the account analytics module 205. Then, in step 215, the account analytics module 205 requests a new user identifier from the account manager module 209 to be associated with the new user. The account analytics module 205 also passes the communication account identifier and the device identifier to the account manager module 209 so that the account manager module 209 can initially register the new user with a communication account and a device. In step 217, the account manager module 209 creates an identifier for the new user and associates the identifier with the communication account identifier and the device identifier. After registration of the new user and creation of the new user identifier, the process of adding a user to the management platform 103 is complete.

Further, in step 219, the account analytics module 205 performs account analytics to one or more user identification characteristics received from a UE 101 to determine a user identity. Here, unlike step 211, the account analytics module 205 recognizes that the user identification characteristics belong to an already registered user, such that the account analytics module 205 identifies the user. The account analytics module 205 passes the user identity to the account indicator module 207 to determine the communication account identifier and the device identifier associated with the UE 101 from which the user identification characteristics were received.

In step 221, the account indicator module 207 passes the communication account identifier and the device identifier associated with the UE 101 that the user is using to interact with the management platform 103 to the account analytics module 205. In step 223, the account analytics module 205 passes the user identifier, the communication account identifier, and the device identifier to the account manager module 209. The account manager module 209 then logs the information and, based on the information, provides the recommendation module 211 with the one or more recommendation models based on the detected user identity, communication account, and/or device.

Figure 3:
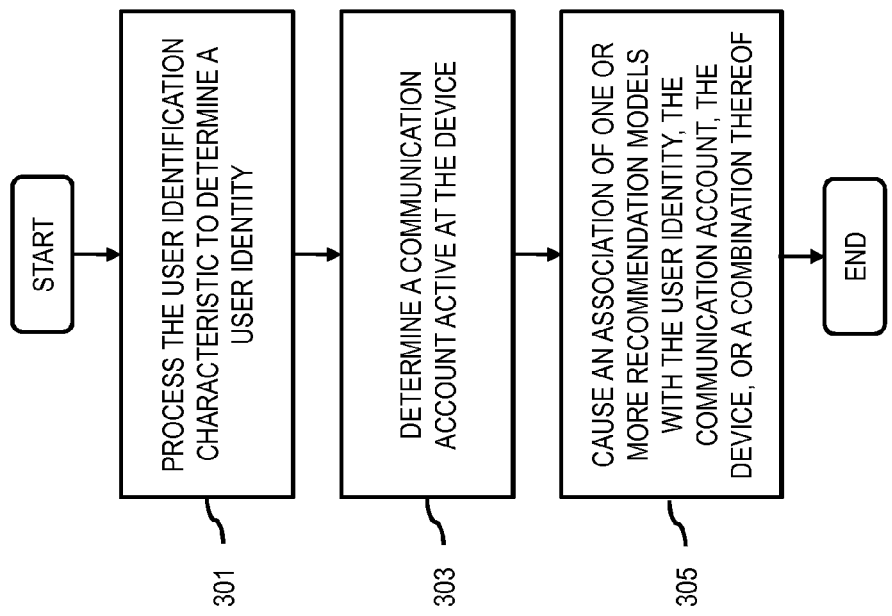
FIG. 3 is a flowchart of a process for managing recommendation models, according to one embodiment.

FIG. 3 is a flowchart of a process for managing recommendation models, according to one embodiment. In one embodiment, the management platform 103 performs the process 300 and is implemented in, for instance, a chip set including a processor and a memory as shown in FIG. 9. In step 301, the management platform 103 processes one or more user identification characteristics to determine a user of a UE 101. As discussed above, the user identification characteristic may be based on the user's gender, the user's speech patterns, the user's interaction patterns, one or more probability engines, a Bayesian analyzer, and the like. As discussed above, the management platform 103 performs account analytics to generate the one or more user identification characteristics using one or more analytic engines.

In one embodiment, despite the UE 101 including a feature the indicates a user logged into the UE 101, the management platform 103 continues to perform account analytics to, for example, obtain user identification characteristics to ensure that the user logged in is actually the user using the UE, or determine if a different user using the UE 101 despite the UE 101 indicating the presence of a user logged into the device.

In one embodiment, the management platform 103 constantly performs account analytics, periodically performs account analytics, or performs account analytics upon an indication from the UE 101, an application running one the UE 101, or some other system 100 feature to perform the account analytics.

In step 303, upon determining the user identity, the management platform 103 determines a communication account active at the UE 101. By way of example, the management platform 103 determines which one of the account identifiers 117 is active at the UE 101. As discussed above, the account identifiers may be, for example, a SIM card associated with the UE 101 and are active according to a setting on the UE 101, or may be active based on current communications from the UE 101 over the communication network 105 using an account identifier 117.

In step 305, the management platform 103 causes an association of one or more recommendation models with the user identity, the at least one communication account, the at least one device, or a combination thereof. The association of the one or more recommendation models allows for more than one recommendation model to be associated with a session of a user using the device, despite the current combination of the user identity, the communication account, and the device traditionally generating only one recommendation model that is used to provide recommendations. Thus, depending on the user identity, the one or more communication accounts associated with the user identity, and the one or more devices associated with the user identity, the current user associated with the user identity can obtain a larger breadth of application usage data to be used to generate one or more recommendations.

Figure 4B:
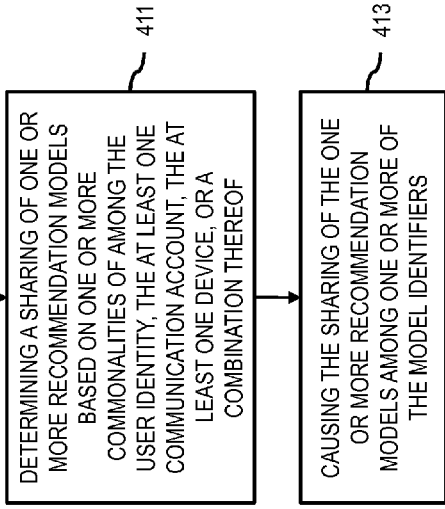
FIG. 4B is a flowchart of a process for sharing one or more recommendation models, according to one embodiment.
Figure 4A:
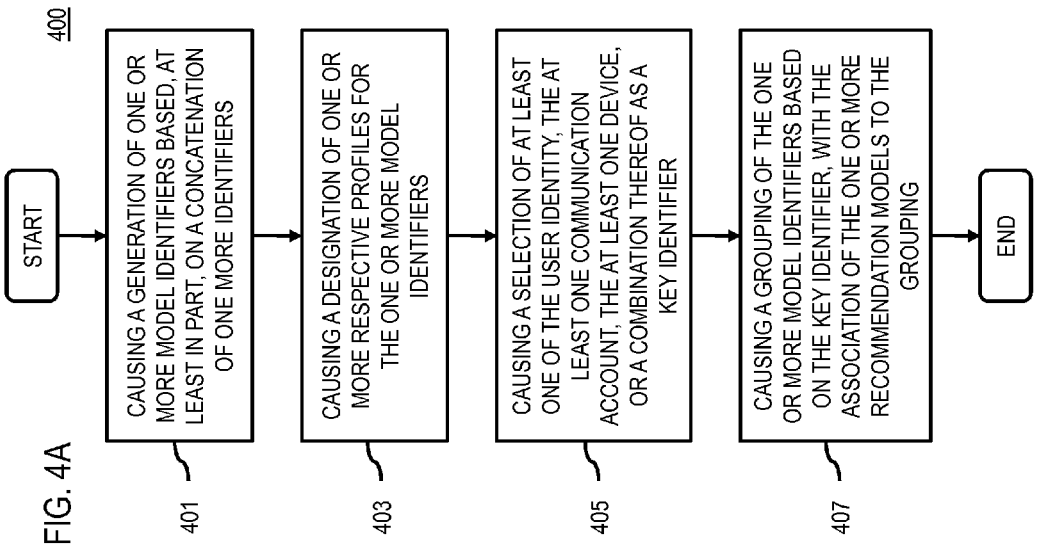
FIG. 4A is a flowchart of a process for associating one or more recommendation models, according to one embodiment.

FIG. 4A is a flowchart of a process for associating one or more recommendation models, according to one embodiment. In one embodiment, the management platform 103 performs the process 400 and is implemented in, for instance, a chip set including a processor and a memory as shown in FIG. 9. In step 401, the management platform 103 determines the various user identities, the various communication accounts, and the various devices associated with the management platform 103 and generates identifiers for all of the user identities, the communication accounts and the devices. The management platform 103 then causes a generation of one or more model identifiers that is a concatenation of the one or more identifiers. The identifiers, and therefore the model identifiers, may be any string of numeric or alphabetic characters that may be a random pattern or may be a non-random pattern. For the user identities, for example, the identifiers can be the names of the various users. For the communication accounts, for example, the identifiers can be the phone numbers associated with the communication accounts. For the devices, for example, the identifiers can be the serial number of the devices. The identifiers allow the management platform 103 to uniquely identify the user identities, the communication accounts, and the devices from other user identities, communication accounts, and devices, respectively. For each one of the model identifiers, the management platform 103 generates at least one recommendation model and/or collects application usage data for use in a recommendation model for the specific combination of, for example, user identity, communication account, and device.

The model identifiers may be any order of the identifiers for the user identities, the communication accounts, and the devices, such as USER.ACCOUNT.DEVICE, USER.DEVICE.ACCOUNT, or ACCOUNT.USER.DEVICE. Where the management platform 103 further determines the context of the user identity in performing the analytics, and uses the context to further distinguish one or more recommendation models, the model identifier may also include an identifier of the context of the user identity, such as USER.USER-CONTEXT.ACCOUNT.DEVICE.

In one embodiment, at step 403, a user may designate through the management platform 103 one or more profiles for the one or more model identifiers. For example, where a user (e.g., USER1) uses an account (e.g., ACCOUNT1) related to business use only, the user may designate the model identifier associated with the user and the account (e.g., USER1.ACCOUNT1) the profile of "business."

At step 405, the user may select at least one of the user identity, a communication account, a device, or a combination thereof as a key identifier. The key identifier allows the user to associate one or more model identifiers, and accordingly their associated one or more recommendation models, based on the key identifier.

At step 407, the management platform 103 causes a grouping of the one or more model identifiers based on the key identifier. Thus, for example, if several model identifiers share the key identifier of a specific user identity, the model identifiers are grouped together according to the specific user identity. If any of the model identifiers do not include the key identifier, than these model identifiers are not included in the group of model identifiers. For a further example, the model identifiers may be grouped together according to a specific user identity and a specific device, such that any model identifier that includes both the specific user identity and the specific device are grouped together. Any model identifier that has only one or none of the specific user identity and the specific device are not included in the group.

For example, a first model identifier includes the specific user identity USER1. A second model identifier also includes the specific user identity USER 1. Despite the other identifiers (e.g., communication account identifier, device identifier) being different, if the user selects the user identity as the key identifier, the first model identifier and the second model identifier may be grouped together, along with their specific recommendation models, such that recommendations for the user are based on both recommendation models. Further, because the recommendation models are associated based on the key identifier, any application usage data associated with the key identifier, is also associated with the recommendation models, at least based on the level of the key identifier (e.g., the user identity). In which case, as any application usage data changes with respect to either the first model identifier or the second model identifier, the changes can be accounted for in both of the recommendation models, at least at the level of the user identity. In one embodiment, the changes with respect to the application usage data may be distinguished on the level of the different identifiers, where appropriate based on the active identifier.

FIG. 4B is a flowchart of a process 450 for sharing one or more recommendation models, according to one embodiment. In one embodiment, the management platform 103 performs the process 450 and is implemented in, for instance, a chip set including a processor and a memory as shown in FIG. 9. In step 411, the user may determine to share one or more recommendation models among one or more of the model identifiers. The management platform 103 determines the sharing based on the user selecting one or more commonalities between the model identifiers, such as common user identities. The sharing of one or more recommendation models associated with the model identifiers allows, for instance, multiple users to share recommendation models despite the recommendation models being associated with different users, if, for example the recommendation models are associated with model identifiers that share commonalities.

By way of example, where two users share the same communication account associated with the same device, recommendation models are generated for each combination of user, communication account, and device. Thus, the recommendation models are separated between users. However, the users may elect to share the recommendation models if, for example, each user considers the other user a trusted party (e.g., the users are husband and wife). Further, where two users share the same device, but do not share the same communication account, the management platform 103 allows the users to share respective recommendation models based, for example, on the commonality of the same device.

In step 413, the management platform 103 causes a sharing of the one or more recommendation models among the one or more model identifiers. Upon sharing the one or more recommendation models among the one or more model identifiers, the user identities, the communication accounts, and/or the devices can receive the same recommendations based on the same recommendation models despite any differences in the users, the communication accounts, and/or devices.

In one embodiment, despite the one or more recommendation models being shared between the user identities, the communication accounts, and/or the devices, the recommendation models are not affected by any application usage data associated with usage of the various user identities, communication accounts, and/or devices. Thus, for example, the recommendation models are able to provide recommendations across the various user identities, communication accounts, and/or devices but the models themselves do not account for application usage data (e.g., explicit selections made by a shared but do not alter the recommendation models).

In one embodiment, the management platform 103 allows only two-way sharing, such that, for example, any user identity, communication account, and/or device that is associated with one or more shared recommendation models have access to the shared recommendation models. In one embodiment, the management platform 103 allows one-way sharing, such that only one of the user identities, communication accounts, and/or devices that are involved in sharing one or more recommendation models are able to access the shared recommendation models, while the other of the user identities, communication accounts, and/or devices that are involved in sharing do not enjoy access to the shared recommendation models.

Figure 5:
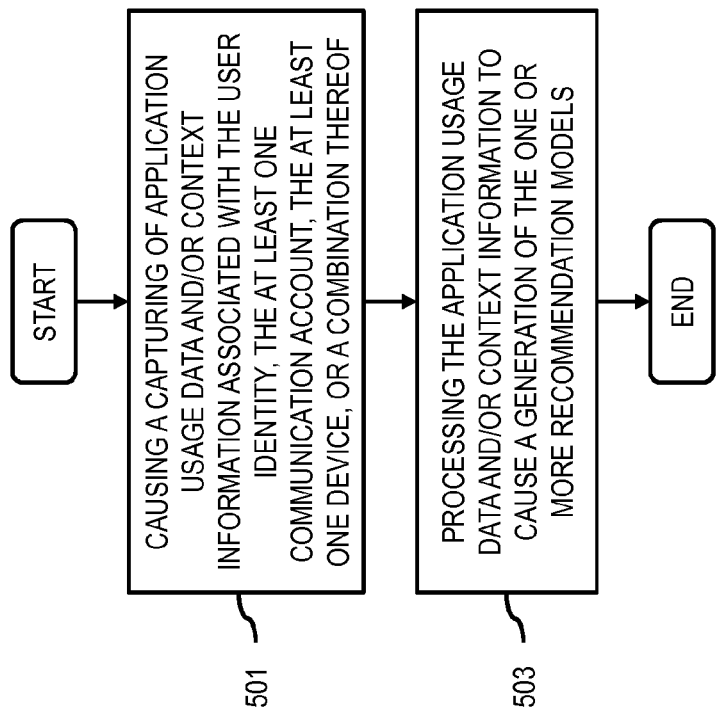
FIG. 5 is a flowchart of a process for generating one or more recommendation models, according to one embodiment.

FIG. 5 is a flowchart of a process for generating one or more recommendation models, according to one embodiment. In one embodiment, the management platform 103 performs the process 500 and is implemented in, for instance, a chip set including a processor and a memory as shown in FIG. 9. In step 501, the management platform 103 causes a capturing of application usage data and/or context information (e.g., information provided by one or more services 109, and the like) associated with the user identity, the at least one communication account, the at least one device, or a combination thereof. Thus, the management platform 103 allows for the capturing of application usage data and/or context information for a single user across multiple communication accounts and/or multiple devices. This allows the user to expand the amount of application usage data that is gathered between communication accounts and devices to provide more information from which recommendations models can be generated and recommendations can be made.

In step 503, the management platform 103 processes the application usage data and/or context information collected from across the user identity, the one or more communication accounts and the one or more devices to generate one or more recommendation models. As discussed above, processing the application usage data may generate latent factor models with one vector for the latent model created for all common items between a user's accounts and/or devices being indexed to the same user (e.g., any combination of user identity, communication account, and device). Multiple vectors maybe created for each combination of user identity, communication account, and device where the application usage data is either not associated between the various user identities, communication accounts, and/or devices (e.g., model identifiers), or where the application usage data is different and the user associated with the specific user identity chooses to keep the multiple vectors (e.g., not associate the recommendation models between the various user identities, communication accounts, and/or devices).

Explicit models (e.g., rule-based) may also be created in a hierarchical structure, with a single model (or representation) created based on the application usage data but separate branches are maintained for each deviation in the application usage data. Thus, for example, all application usage data for a user is maintained in a single branch at the user identity level, while specific branches of the hierarchical structure are built for the same user with differences in the application usage data at the communication account level and/or at the device level. When using an explicit model for recommendation services (e.g., in response to applications/recommendation engines), the user identity level is may be alone, may be narrowed down to a communication account level and/or a device level (e.g., branches off of the user identity level).

Figure 6:
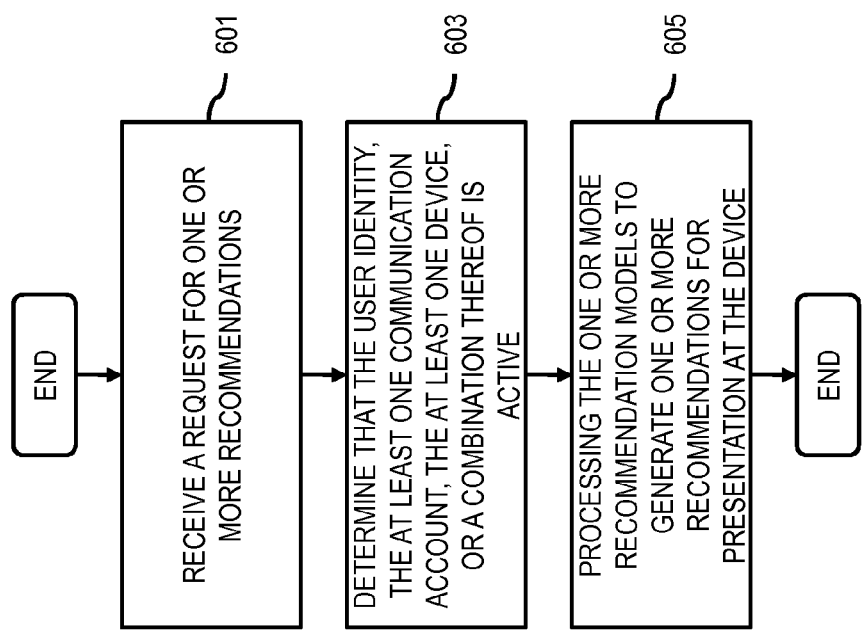
FIG. 6 is a flowchart of a process for generating one or more recommendations, according to one embodiment.

FIG. 6 is a flowchart of a process for generating one or more recommendations, according to one embodiment. In one embodiment, the management platform 103 performs the process 600 and is implemented in, for instance, a chip set including a processor and a memory as shown in FIG. 9. In step 601, the management platform 103 receives a request for one or more recommendations associated with a UE 101. The management platform 103 may receive the request from the UE 101, one or more services 109 on the services platform 107, and one or more content providers 113.

In step 603, the management platform 103 determines that the user identity, the at least one communication account, the at least one device, or a combination thereof is active. The management platform 103 then determines the one or more recommendation models that are associated with, and or shared with, the active user identity, the active one or more communication accounts, the active device, or the combination thereof. The management platform 103 determines the one or more recommendation models based on the policies stored in the profile database 121 with respect to the active user identity, the active one or more communication accounts, the active device, or the combination thereof and the associations and or sharing associated with the active user identity, the active one or more communication accounts, the active device, or the combination thereof.

By way of example, the account manager module 209 may obtain policies stored in the profile database 121 that may indicate that three recommendation models are associated with an active user identity, based on the current communication account and device, and two other communication accounts and devices. Thus, the management platform 103 associates the three recommendation models with the request for one or more recommendations.

In step 605, the management platform 103 processes the one or more recommendation models to generate one or more recommendations for presentation at the UE 101. Thus, by way of determining the one or more recommendation models associated with the active user identity, the active communication account, and/or the active at least one device, the management platform 103 is able to provide a more personalized experience to the user despite the user, for example, having divided application usage data between different accounts and/or different devices.

Figure 7B:
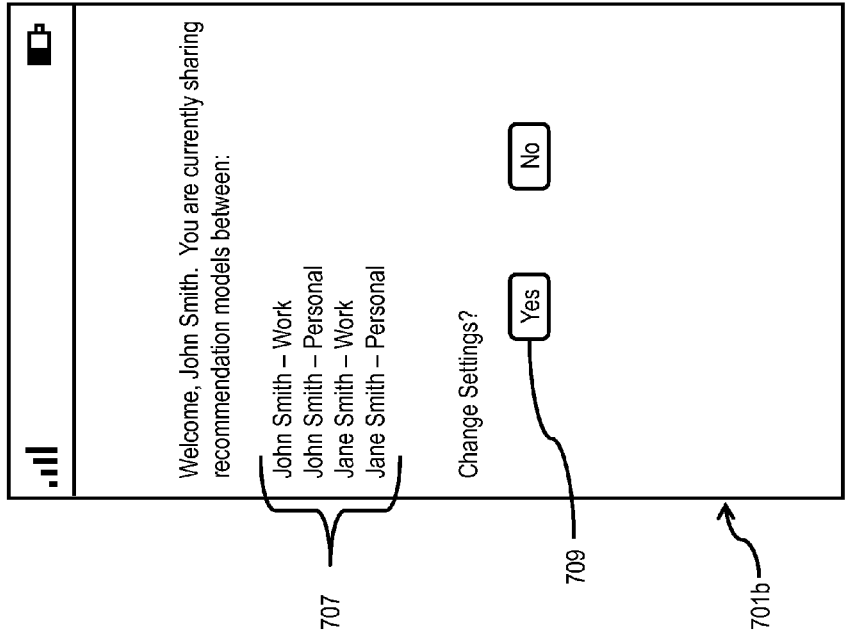
Figure 7A:
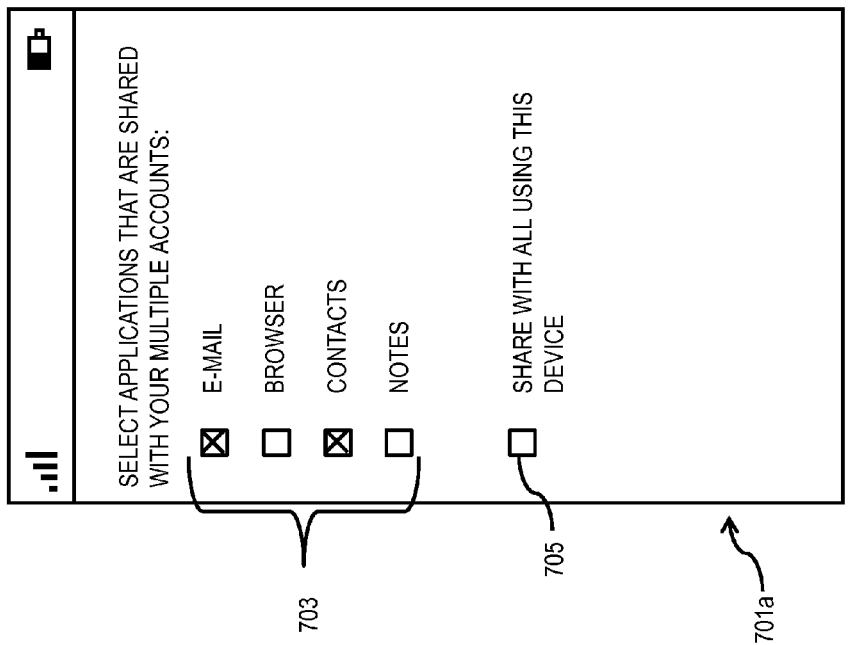

FIGS. 7A-7C are diagrams of user interfaces utilized in the processes of FIGS. 3-6, according to various embodiments. FIG. 7A illustrates the user interface 701a associated with a UE 101 when the management platform 103 determines that a single user has multiple communication accounts on a single device, and prompts the user whether to merge the recommendation models associated with the multiple communication accounts based on sharing applications (e.g., application usage data) between the communication accounts. Indicator 703 of the user interface 701a allows the user to select the specific applications 111 that the user wants share between the communication accounts. Here, the user has selected to share the application usage data between the e-mail applications 111 and the contacts applications 111. In one embodiment, where multiple users share the same UE 101, the management platform 103 also provides the user with the indicator 705 that allows the user to share the application usage data between the other users associated with the UE 101.

FIG. 7B illustrates the user interface 701b associated with a UE 101 when the management platform 103 allows multiple users to share information between multiple user identities and multiple communication accounts associated with the multiple user identities. By way of example, the indicator 707 illustrates that the UE 101 associated with the user interface 701b is associated with two user identities (e.g., John Smith and Jane Smith) and two communication accounts (e.g., Work and Personal). In the illustrated embodiment, the communication accounts (e.g., Work and Personal) may be shared communication accounts between John Smith and Jane Smith or may be unique communication accounts, such that there are four communication accounts all together. Selecting the indicator 709 allows the current user (e.g., John Smith or Jane Smith) to alter the sharing settings.

FIG. 7C illustrates the user interface 701c associated with a UE 101 where a user (e.g., John Smith) can control the communication accounts and devices that are associated, and therefore control the recommendation models that are associated. As illustrated in the user interface 701c, indicators 711 allow the user to select to merge model identifiers associated with ACCOUNT 1-DEVICE 1, ACCOUNT 2-DEVICE 2, ACCOUNT 3-DEVICE 3, and ACCOUNT 1-DEVICE 4. Thus, the user can merge model identifiers associated with different communication accounts, difference devices, and different communication accounts and devices. Although not illustrated, in one embodiment, the user interface 701c further permits the user to select the communication accounts and the devices separately.

The processes described herein for managing recommendation models may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
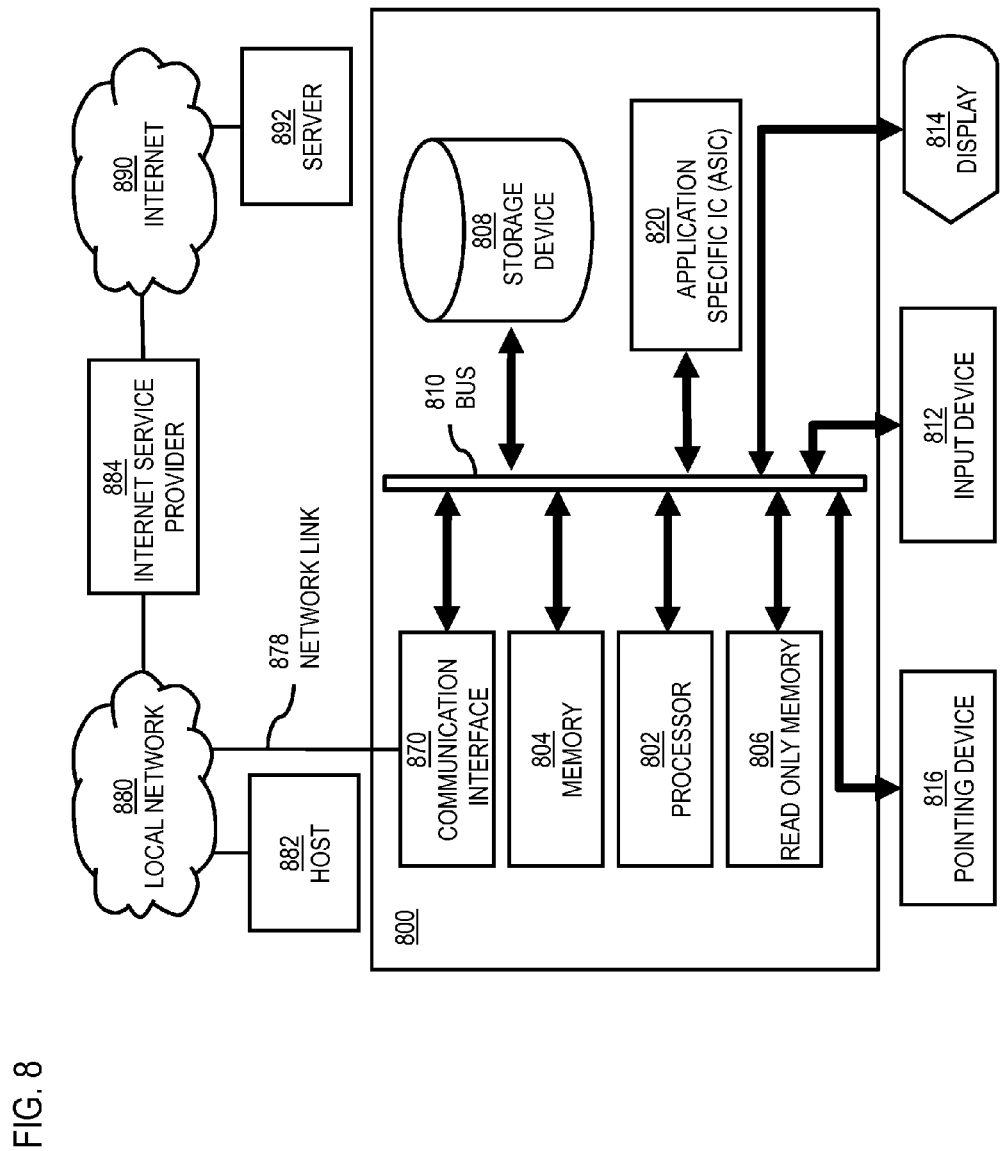
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to manage recommendation models as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of managing recommendation models.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to managing recommendation models. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for managing recommendation models. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for managing recommendation models, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for managing recommendation models at the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to manage recommendation models as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of managing recommendation models.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to manage recommendation models. The memory 905 also stores the data associated with or generated by the execution of the inventive steps.

Figure 10:
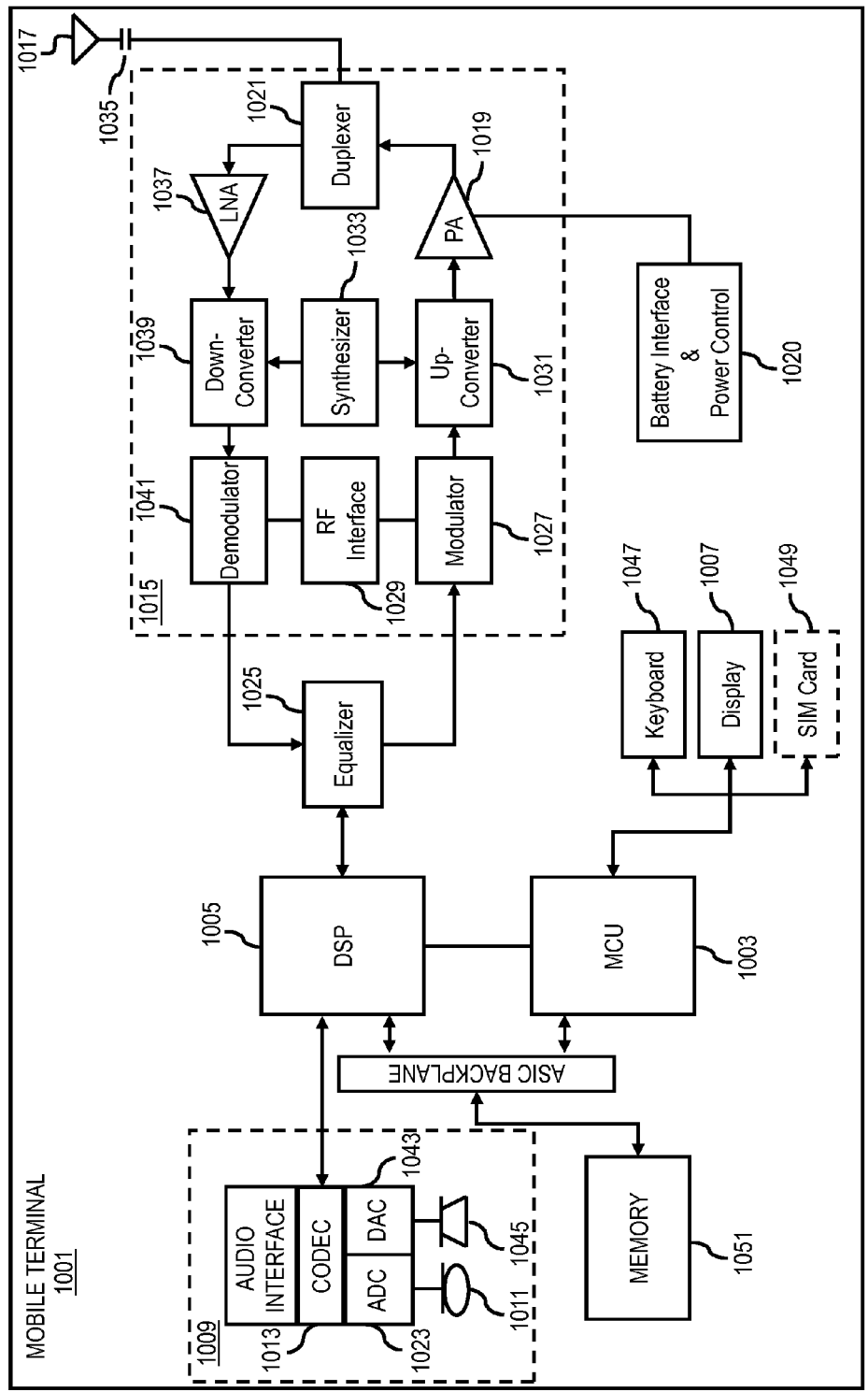
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of managing recommendation models. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of managing recommendation models. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to manage recommendation models. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of or processing (1) data, (2) information, or (3) at least one signal, the (1) data, (2) information, or (3) at least one signal based, at least in part, on the following:
   a processing of user identification characteristics associated with at least one device to determine a user identity, wherein the user identification characteristics comprise at least an interaction pattern of a user interacting with the at least one device, and the processing includes analyzing probabilities associated with the user;
   at least one user communication account active at the at least one device;
   a generation of one or more recommendation models based on application usage data and context information associated with one or more identifiers of the user identity, one or more identifiers of the at least one user communication account, and one or more identifiers of the at least one device;
   an association of the one or more recommendation models with one or more model identifiers based, the association based, at least in part, on the user identity, the at least one user communication account, and the at least one device;
   a storage of the one or more recommendation models and the association; and
   in response to a recommendation request, a processing of the one or more recommendation models based on the association for generating one or more recommendations;
   wherein the one or more model identifiers are generated using a concatenation of one or more identifiers of the user identity, one or more identifiers of the at least one user communication account associated with a management platform, and one or more identifiers of the at least one device, wherein the one or more identifiers of the user identity identify the users associated with the management platform.

2. The method of claim 1, wherein the (1) data, (2) information, or (3) at least one signal are further based, at least in part, on the following:
   a designation of one or more respective profiles for the one or more model identifiers, wherein the concatenation further includes one or more identifiers of context of the user identity.

3. The method of claim 2, wherein the (1) data, (2) information, or (3) at least one signal are further based, at least in part, on the following:
   a selection of at least one of the user identity identifier, the at least one communication account identifier, the at least one device, or a combination thereof, of a model identifier of the one or more model identifiers as a key identifier; and
   a grouping of the one or more model identifiers based, at least in part, on the key identifier,
   wherein the association of the one or more recommendation models is to the grouping, and wherein the context of the user identity includes analytic context of the user identification characteristics.

4. The method of claim 3, wherein the (1) data, (2) information, or (3) at least one signal are further based, at least in part, on the following:
   a sharing of the one or more recommendation models among one or more of the model identifiers based on a common user, a common user communication account, a common device, or a combination thereof,
   wherein the analytic context of the user identification characteristics includes user voice analysis, user interaction analysis, user fingerprint analysis, or a combination thereof.

5. The method of claim 4, wherein the (1) data, (2) information, or (3) at least one signal are further based, at least in part, on the following:
   sharing based, at least in part, on one or more commonalities of among the user identity, the at least one communication account, the at least one device, or a combination thereof.

6. The method of claim 1, wherein the (1) data, (2) information, or (3) at least one signal are further based, at least in part, on the following:
   a capturing of the application usage data and the context information.

7. The method of claim 1, wherein the (1) data, (2) information, or (3) at least one signal are further based, at least in part, on the following:
   determining that the user identity, the at least one communication account, the at least one device, or a combination thereof is active; and
   presentation of the one or more recommendations at the at least one device,
   wherein the processing of the one or more recommendation models includes retrieving one or more the stored recommendation models based on one of the identifiers of the user identity, one of the identifiers of the at least one user communication account, and one of the identifiers of the at least one device associated with the recommendation request.

8. The method of claim 1, wherein the one or more recommendation models are based, at least in part, on one or more latent factor models, one or more rule-based models, or a combination thereof, and the at least one user communication account active at the at least one device includes user communication accounts associated with different subscriber identity modules.

9. The method of claim 1, wherein the (1) data, (2) information, or (3) at least one signal are further based, at least in part, on the following:

a determination of the at least one user identification characteristic based, at least in part, on one or more recognition engines.

10. An apparatus comprising:

at least one processor; and at least one memory including computer program code for one or more programs, the at least one memory and the computer program code configured to, with the at least one processor, cause the apparatus to perform at least the following, process user identification characteristics associated with at least one device to determine a user identity, wherein the user identification characteristics comprise at least an interaction pattern of a user interacting with the at least one device, and the processing includes analyzing probabilities associated with the user;

determine at least one user communication account active at the at least one device;

cause, at least in part, a generation of one or more recommendation models based on application usage data and context information associated with one or more identifiers of the user identity, one or more identifiers of the at least one user communication account, and one or more identifiers of the at least one device;

cause, at least in part, an association of one or more recommendation models with the one or more model identifiers, the association based, at least in part, on the user identity, the at least one user communication account, and the at least one device;

cause, at least in part, a storage of the one or more recommendation models and the association; and in response to a recommendation request, cause, at least in part, a processing of the one or more recommendation models based on the association for generating one or more recommendations wherein the one or more model identifiers are generated using a concatenation of one or more identifiers of the user identity, one or more identifiers of the at least one user communication account of a management platform, and one or more identifiers of the at least one device associated with the management platform.

11. The apparatus of claim 10, wherein the apparatus is further caused to:

cause, at least in part, a designation of one or more respective profiles for the one or more model identifiers.

12. The apparatus of claim 10, wherein the apparatus is further caused to:

cause, at least in part, a selection of at least one of the user identity identifier, the at least one communication account identifier, the at least one device identifier, or a combination thereof, of a model identifier of the one or more model identifiers as a key identifier; and cause, at least in part, a grouping of the one or more model identifiers based, at least in part, on the key identifier, wherein the association of the one or more recommendation models is to the grouping.

13. The apparatus of claim 10, wherein the apparatus is further caused to:

cause, at least in part, a sharing of the one or more recommendation models among one or more of the model identifiers based on a common user, a common user communication account, a common device, or a combination thereof.

14. The apparatus of claim 13, wherein the apparatus is further caused to:

determine the sharing based, at least in part, on one or more commonalities of among the user identity, the at least one communication account, the at least one device, or a combination thereof.

15. The apparatus of claim 10, wherein the apparatus is further caused to:

cause, at least in part, a capturing of the application usage data and the context information.

16. The apparatus of claim 10, wherein the apparatus is further caused to:

determine that the user identity, the at least one communication account, the at least one device, or a combination thereof is active; and presentation of the one or more recommendations at the at least one device, wherein the processing of the one or more recommendation models includes retrieving one or more the stored recommendation models based on one of the identifiers of the user identity, one of the identifiers of the at least one user communication account, and one of the identifiers of the at least one device associated with the recommendation request.

17. The apparatus of claim 10, wherein the one or more recommendation models are based, at least in part, on one or more latent factor models, one or more rule-based models, or a combination thereof.

18. The apparatus of claim 10, wherein the apparatus is further caused to:

determine the at least one user identification characteristic based, at least in part, on one or more recognition engines.

* * * * *